(12) United States Patent
Akamatsu et al.

(10) Patent No.: US 6,641,654 B2
(45) Date of Patent: Nov. 4, 2003

(54) WATER-REPELLENT GLASS PANE AND METHOD FOR PRODUCING SAME

(75) Inventors: Yoshinori Akamatsu, Mie (JP); Shigeo Hamaguchi, Mie (JP); Yoshihiro Nishida, Mie (JP); Hideki Yamamoto, Mie (JP)

(73) Assignee: Central Glass Company, Limited, Ube (JP)

( * ) Notice: Subject to any disclaimer, the term of this patent is extended or adjusted under 35 U.S.C. 154(b) by 0 days.

(21) Appl. No.: 09/993,516

(22) Filed: Nov. 27, 2001

(65) Prior Publication Data

US 2002/0073733 A1 Jun. 20, 2002

Related U.S. Application Data

(62) Division of application No. 08/914,171, filed on Aug. 19, 1997, now Pat. No. 6,337,133.

(30) Foreign Application Priority Data

Aug. 19, 1996 (JP) ............................................. 8-217510
Dec. 13, 1996 (JP) ............................................. 8-333329

(51) Int. Cl.$^7$ .......................................... C09D 183/00
(52) U.S. Cl. ................................................. 106/287.14
(58) Field of Search .................................... 106/287.14

(56) References Cited

U.S. PATENT DOCUMENTS

| | | | |
|---|---|---|---|
| 5,300,315 A | | 4/1994 | Prando et al. |
| 5,368,892 A | | 11/1994 | Berquier |
| 5,437,894 A | | 8/1995 | Ogawa et al. |
| 5,739,369 A | * | 4/1998 | Matsumura et al. ........ 556/425 |
| 6,235,833 B1 | | 5/2001 | Akamatsu |
| 6,337,133 B1 | * | 1/2002 | Akamatsu et al. .......... 428/410 |

FOREIGN PATENT DOCUMENTS

| | | |
|---|---|---|
| EP | 0477805 | 4/1992 |
| EP | 0548775 | 6/1993 |
| EP | 0738771 | 10/1996 |
| JP | 57-181091 | 11/1982 |
| JP | 58-122979 | 7/1983 |
| JP | 58-129082 | 8/1983 |
| JP | 3-247537 | 11/1991 |
| JP | 5-96679 | 4/1993 |
| JP | 9-132433 | 5/1997 |

OTHER PUBLICATIONS

Database WPI, XP–002123304, Derwent Publications Ltd., Abstract of JP6–263,684, (Sep. 20, 1994).

K. Mikami et al., "Binaphthol–Titanium Complex—Catalyzed Fluoral–Ene Reaction with Vinyl Sulfides for Asymmetric Synthesis of Diastereomeric α–Trifluoromethyl–β—methyl Carbinols:Diastereomer Switch of Antiferroelectric or Ferroelectric Properties of Diastereomeric Liquid–Crystalline Systems", Synlett (Sep. 1996,) pp. 837–838.

Koichi Mikami et al, "Asymmetric Catalysis of Carbonyl–Ene and Aldol Reactions with Fluoral by Chiral Binaphthol–Derived Titanium Complex", Elsevier Science, Ltd., *Tetrahedron*, vol. 52, No. 1, (1996,) no month provided pp. 85–98.

Angelo Clerici et al., "Radical Addition to the Carbonyl Carbon Promoted by Aqueous Titanium Trichloride: Stereoselective Synthesis of α, β–Dihydroxy Ketones", J. Org. Chem., (1989) no month provided, vol. 54, pp. 3872–3878.

Akihiro Ishii et al., "Asymmetric Friedel–Crafts Reactions of Vinyl Ethers with Fluoral Catalyzed by Chiral Binaphthol–derived Titanium Catalysts", Journal of Fluorine Chemistry, vol. 97, (1999,) no month provided pp. 51–55.

Abstract of JP 01 167393, (Jul. 3, 1989) Derwent Publications Ltd., London, GB XP002048398.

Abstract of "Development of a Transparent and Ultrahydrophobic Glass Plate," Ogawa et al., Japanese Journal of Applied Physics, Part 2 (Letters), vol. 32, No. 4B, (Apr. 1993), pp. L614–L615, Institute of Electrical Engineers, Stevenage, GB, Inspec. No. 4442509, XP002065964.

Abstract of JP 09 002840 (Jan. 7, 1997), Patent Abstracts of Japan, vol. 097, No. 005, May 30, 1997.

* cited by examiner

Primary Examiner—David Brunsman
(74) Attorney, Agent, or Firm—Crowell & Moring LLP

(57) ABSTRACT

The invention relates to a water-repellent glass pane having a glass substrate and a water-repellent film formed thereon. This glass pane is prepared by a first or second method. The first method includes sequential steps of (a) mixing together a raw material for producing the water-repellent film, an organic solvent for diluting the raw material, and water for hydrolyzing the raw material, such that the raw material is subjected to hydrolysis and then to dehydration and polycondensation, thereby to turn a mixture of the raw material, the organic solvent and the water into a sol; (b) adjusting water content of the sol, thereby to prepare a coating liquid; and (c) applying the coating liquid to the glass substrate, in an atmosphere having a first temperature and a relative humidity. The second method includes sequential steps of: (a) subjecting a surface of the glass substrate to an abrasive treatment; (b) subjecting the surface of the glass substrate to an acid treatment; and (c) applying a coating liquid to the surface of the glass substrate. The glass pane prepared by the first or second method is superior in abrasion resistance, sunshine resistance, hardness, adhesion to the glass substrate, and water-repellency for a long time.

4 Claims, 3 Drawing Sheets

WATER-REPELLENT GLASS PANE AND METHOD FOR PRODUCING SAME

This application is a division of application Ser. No. 08/914,171, filed Aug. 19, 1997 now U.S. Pat. No. 6,337,133 Jan. 8, 2002.

BACKGROUND OF THE INVENTION

The present invention relates to a water-repellent glass panes which are usable for architectural, automotive, watercraft and aircraft windows, and methods for producing such glass panes.

Recently, there is a demand for water-repellent glass panes which are superior in durability and water repellency for a long time. In general, a water-repellent glass pane is produced by forming a water-repellent thin film on a glass substrate. There is known sol-gel process for forming a water-repellent thin film and other various functional thin films on glass substrates. In this process, a raw material of the film is mixed with a suitable solvent and water. Due to this mixing, the raw material is subjected to hydrolysis and then to dehydration and polycondensation. With this, the resultant mixture turns into a sol. Then, this sol is applied to a glass substrate, thereby to form thereon a precursory film. Then, the precursory film is dried and then optionally heated, thereby to form thereon a functional thin film. With this step, water and/or alcohol is removed from the precursory film.

Japanese Patent Unexamined Publication JP-A-57-181091 teaches the use of a dehydrator for removing water formed as a by-product, in the production of cyclic methyl (1-trifluoromethylethy1)polysiloxane represented by a general formula (I) disclosed therein.

JP-A-5-96679 discloses a water-repellent, oil-repellent monomolecular film. This film is chemically bonded to the surface of a substrate by a covalent bond containing —Si— group and is formed of molecules of at least two types having different molecular chain lengths.

JP-A-9-132433, which has an application number of 7-294106, discloses a water-repellent glass pane. This glass pane has a glass substrate, a first metal oxide thin film directly formed on the glass substrate, and a second water-repellent thin film formed on the first film. The first film is prepared by a sol-gel process and has a minutely rough surface. In the preparation of the first film, a particular sol is applied to the surface of the glass substrate in an atmosphere of 25° C. and a relative humidity of from 45 to 70%.

JP-A-3-247537 discloses a method for producing a water-repellent glass plate. This method comprises sequential steps of (a) abrading a surface of a glass substrate by using a abrasive powder, while the surface is washed; (b) forming thereon a precursory film by applying a silicone-based water-repellent agent thereto; and (c) curing the precursory film into a water-repellent film having a thickness of from 0.1 to 2 μm. The water-repellent agent is prepared by replacing at least 5% of hydrogen atoms of alkyl group of polydialkylsiloxane with fluorine atoms.

JP-A-58-122979 discloses in Example 1 a method for forming a water-repellent, oil-repellent thin film on a glass substrate. In this method, a glass substrate is washed with a detergent and acetone, then is immersed in a 1% hydrochloric acid solution, and then is dried. Then, a particular coating liquid is applied to the surface of the glass substrate. Then, the obtained thin film formed on the glass substrate is cured at 120° C. for 20 minutes in an atmosphere of a relative humidity of 100%. JP-A-58-129082 discloses in Example 1 another method for forming a water-repellent, oil-repellent thin film on a glass substrate. This method is the same as that of JP-A-58-122979. except in that the coating liquid composition is different from that of JP-A-58-122979 and that the curing temperature is 160° C., in place of 120° C.

SUMMARY OF THE INVENTION

It is an object of the present invention to provide a water-repellent glass pane having a water-repellent film formed on a glass substrate, which film is superior in abrasion resistance, sunshine resistance, hardness, adhesion to the glass substrate, and water-repellency for a long time It is another object of the present invention to provide a method for producing such water-repellent glass pane, which method is superior in safety, simplicity and efficiency.

According to a first aspect of the present invention, there is provided a water-repellent glass pane having a glass substrate and a water-repellent film formed on the glass substrate. This glass pane is prepared by a first method comprising sequential steps of:

(a) mixing together a raw material for producing skid water-repellent film, an organic solvent for diluting said raw material, and water for hydrolyzing said raw material, such that said raw material is subjected to hydrolysis and then to dehydration and polycondensation, thereby to turn a mixture of said raw material, said organic solvent and said water into a sol;

(b) adjusting water content of said sol, thereby to prepare a coating liquid; and (c) applying said coating liquid to said glass substrate, in an atmosphere having a first temperature and a relative humidity.

According to the first aspect of the present invention, there is prepared by the step (b) a coating liquid wherein the degree of polycondensation of the raw material is high and stable. Due to the application of this coating liquid to a glass substrate, there is formed on the glass substrate a water-repellent film which is superior in abrasion resistance, sunshine resistance, hardness, adhesion to the glass substrate, and water-repellency for a long time.

According to a second aspect of the present invention there is provided a water-repellent glass pane having a glass substrate and a water-repellent film formed on the glass substrate. This glass pane is prepared by a second method comprising sequential steps of:

(a) subjecting a surface of said glass substrate to an abrasive treatment;

(b) subjecting said surface of said glass substrate to an acid treatment; and (c) applying a coating liquid to said surface of said glass substrate.

According to the second aspect of the present invention, it becomes possible by the step (a) to substantially completely remove stains and scales of the glass substrate's surface and a very thin glassy layer formed on the glass substrate's surface, such as a silica-rich layer formed on the surface of a curved glass and/or tempered glass. Furthermore, advantageous effects of the step (b) are enhanced by the step (a). By the acid treatment of the step (b), silanol groups are effectively formed on the glass substrate's surface. These silanol groups contribute to increase the water-repellent film in adhesion to the glass substrate.

In the present invention, it is optional to combine the above-mentioned first and second aspects of the present invention. In other words, the coating liquid prepared in accordance with the steps (a) and (b) of the first method of the first aspect may be applied to the glass substrate prepared in accordance with the steps (a) and (b) of the second method of the second aspect, in the atmosphere of the step (c) of the first method of the first aspect.

DESCRIPTION OF THE PREFERRED EMBODIMENTS

Figure 1:
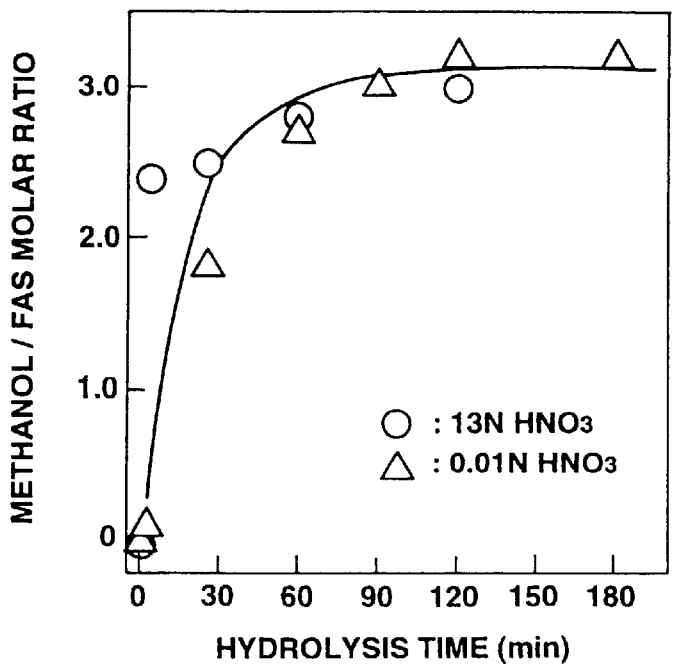
FIG. 1 is a graph showing the change of the molar ratio of methanol, formed by hydrolysis of a fluoroalkylalkoxysilane (FAS), to the FAS, with the period of time of the hydrolysis, in cases that 0.01 N $HNO_3$ and 13 N $HNO_3$ were respectively used as an acid catalyst in the preparation of the coating liquid of the first aspect of the present invention.

In the invention, the glass substrate is not particularly limited in color, color tone, functionality, shape and the like. In fact, it may be colorless or colored, as long as it is transparent. Furthermore, the glass substrate may be a curved or fat glass plate, a single glass plate, a laminated glass plate, a double glazing unit, or a tempered glass plate. A functional thin film other than that of the present invention is optionally formed thereon.

In the invention, the raw material for producing the water-repellent film may be at least one compound selected from fluoroalkylalkoxysilanes (FAS) and alkylalkoxysilanes (AS). Nonlimitative examples of FAS are $CF_3CH_2CH_2Si(OCH_3)_3$, $CF_3(CF_2)_5CH_2CH_2Si(OCH_3)_3$, $CF_3(CF_2)_5CH_2CH_2SiCH_3(OCH_3)_2$, $CF_3(CF_2)_7CH_2CH_2Si(OCH_3)_3$, and $CF_3(CF_2)_7CH_2CH_2SiCH_3(OCH_3)_2$. Nonlimitative examples of AS are $[(CH_3)_3Si-O]_3Si-CH_2CH_2-Si(OCH_3)_3$, $CH_3(CH_2)_{17}Si(OCH_3)_3$, and $CH_3(CH_2)_{17}Si(CH_3)(OCH_3)_2$.

In the invention, nonlimitative examples of the organic solvent for diluting the raw material are lower alcohols each having a carbon atom number of up to 5, such as isopropyl alcohol, methanol and ethanol, ethers, and ketones. It is preferable that the organic solvent is at least one of these lower alcohols and particularly contains isopropyl alcohol as a main component thereof. The organic solvent is in an amount preferably of from 5 to 40 parts by weight, more preferably of from 5 to 35 parts by weight, still more preferably of from 5 to 30 parts by weight, relative to 1 part by weight of the raw material. If it is more than 40 parts by weight, the water-repellent film may become inferior in the after-mentioned abrasion resistance test. That is, the contact angle of water drop disposed on the film which has been subjected to the abrasion resistance test may become too low. It is preferable that the organic solvent does not contain water, but it may contain a negligible amount of water.

In the invention, it is preferable to use an acid catalyst to be mixed with the raw material and the organic solvent in the preparation of the coating liquid. Water contained in the acid catalyst serves to hydrolyze the raw material. Nonlimitative examples of the acid catalyst are nitric acid having a concentration of at least 0.01 N, preferably of from about 0.1 N to about 13N, and hydrochloric acid, sulfuric acid, and organic acids such as acetic acid. The amount of water contained in the acid catalyst is in an amount preferably of from 0.09 to 1.0 part by weight, more preferably of from 0.10 to 1.0 part by weight, still more preferably of from 0.13 to 1.0 part by weight, still further preferably of from 0.20 to 1.0 part by weight, relative to 1 part by weight of the raw material. The amount of this water is adjusted by changing the acid concentration of the acid catalyst and the total amount of the acid catalyst itself. An amount of the water exceeding 1.0 part by weight does not cause particular adverse effects, but is not preferable only from the economical viewpoint. If it is less than 0.09 parts by weight, the water-repellent film may become inferior in water repellency in the abrasion resistance test.

In the invention, a mixture of the raw material, the organic solvent and the acid catalyst may be stirred for a period of time preferably of at least about 90 minutes, more preferably of at least about 120 minutes, in order to complete hydrolysis of the raw material. With this stirring, this mixture is turned into a sol. According to the first aspect of the invention, water content of this sol may be adjusted by immersing a dehydrator in this sol for a period of time preferably of at least 1 hr. In other words, water content of the sol decreases by this immersion. Nonlimitative examples of the dehydrator are molecular sieve, calcium chloride, magnesium sulfate and sodium sulfate. With the immersion, there can be adjusted the degree of polycondensation of the dispersed phase of the sol. The thus obtained coating liquid, which is also in the form of sol, has a water content preferably of up to about 4,000 ppm, more preferably of up to about 3,000 ppm, still more preferably of up to about 2,000 ppm. The water content of the coating liquid can be measured by using a Karl Fischer's coulometric titration method. In this method, silanol groups of the coating liquid are unintentionally included in water. In other words, to be accurate, the water content of the coating liquid, which has been measured by this method, is the content of the total of water and silanol groups thereof.

According to the first aspect of the invention, the coating liquid is applied to a glass substrate in an atmosphere having a temperature, which is preferably room temperature, and a relative humidity preferably of up to about 75%, more preferably of up to about 60%, still more preferably of from about 15% to about 60%, still further preferably of from about 15% to about 55%. In the present invention, a preferable temperature range of "room temperature" is from 20 to 30° C. Upon the application of the coating liquid to a glass substrate, the glass substrate has a temperature preferably of at least room temperature, for example, of from 20 to 50° C.

In the first aspect of the invention, it is preferable to apply the coating liquid to the top surface of a float glass substrate, because the water-repellent film formed on the top surface thereof is superior to that formed on the bottom surface thereof, in the after-mentioned sunshine resistance and abrasion resistance tests. The top surface is opposed to the bottom surface which has been in a direct contact with the tin bath of the float glass production line. However, the bottom surface of a float glass substrate, in place of the top surface, can also be coated with the water-repellent film, if the bottom surface is sufficiently abraded by using a powder of ceria or alumina and a brush or sponge so as to remove the influence of tin from the bottom surface.

In the invention, the coating liquid may be applied to a glass substrate by one of conventional application methods such as a coating by rubbing a tissue paper or the like moistened with the coating liquid against the glass substrate, flow coating, dip coating, spraying, reverse roller coating, spin coating, flexography, and other printings.

In the invention, a water-repellent film formed by applying the coating liquid to a glass substrate can be heated at a temperature preferably of from 50 to 350° C., more preferably of from about 80 to about 300° C., for a period of time of from 1 to 60 minutes, in order to dry and cure the film.

According to the second aspect of the invention, a surface of a glass substrate is subjected to an abrasive treatment and then to an acid treatment. After that, a coating liquid is applied to this surface of the glass substrate. The surface of the glass substrate is preferably the top surface of a float glass plate or the surface of a rolled-out glass plate. These glass plates may be bent and/or tempered, prior to the acid treatment.

The abrasive treatment may be conducted in a dry or wet method by rubbing an abrasive (i.e., a brush, a piece of sponge or cloth, or the like) against the surface of the glass substrate, using an abrasive agent containing as a main component at least one inorganic metal oxide selected from ceria, alumina, silicon oxide and the like. This abrasive agent has an average particle diameter preferably of up to about 5 µm, more preferably of up to about 1 µm. In the abrasive treatment, the degree of scratches on the glass substrate or the degree of abrasion thereof can be adjusted by suitably changing the type of the abrasive agent, the particle diameter thereof, the type of the abrasive, the pressure added to the glass substrate by the abrasive, and the like.

As a wet method of the abrasive treatment, there can be used an abrasive liquid which is a suspension containing the above-mentioned abrasive agent suspended in water. This abrasive agent is in an amount preferably of from 0.1 to 10 wt %, more preferably of from 0.5 to 5 wt %, based on the total weight of water contained in the abrasive liquid. If it is less than 0.1 wt %, stains and scales of the glass substrates surface may not completely be removed therefrom. If it is greater than 10 wt %, the degree of scratches thereon may become excessive. Furthermore, the abrasive agent may be wasted too much. As an exemplary case of wet method of the abrasive treatment, a glass substrate surface may be abraded by a brush rotating at a rate of about 200 rpm under a load of about 0.02 kg/cm$^2$, using an abrasive liquid containing about 1 wt % of a commercial abrasive agent, MIREK (A+B) of Mitsui Kinzoku Kogyo Co., suspended in water thereof. This abrasive agent is a ceria powder having a particle diameter of from about 1.0 to about 1.4 µm. In this exemplary case, scratches can not be seen on the glass substrate surface under a normal condition. Furthermore, it becomes possible to completely remove stains and scales of the glass substrate's surface and a very thin glassy layer formed on the glass substrate's surface, such as a silicarich layer formed on the surface of a curved glass and/or tempered glass. Still furthermore, advantageous effects of the acid treatment are enhanced by the abrasive treatment.

According to the second aspect of the invention, the acid treatment can be conducted by immersing the glass substrate into an acid liquid having a temperature of from 5 to 70° C., preferably from 10 to 60° C., for a period of time of from 10 to 600 seconds, preferably from 15 to 420 seconds. The acid liquid is an aqueous solution which has a pH of up to 4, preferably up to 3.5, and contains at least one compound selected from inorganic acids (e.g., hydrochloric acid, sulfuric acid and nitric acid) and organic acids (e.g., acetic acid, formic acid and oxalic acid). By the acid treatment, silanol groups are effectively formed on the glass substrate's surface through the sodium ion's extraction and the severance of siloxane bond. These silanol groups contribute to allow fluoroalkyl groups of the water-repellent film to adhere to the glass substrate. With this, the water-repellent film is increased in adhesion to the glass substrate. If the temperature of the acid liquid is lower than 5° C., the rate of a reaction for forming the above silanol groups may be substantially lowered. With this, the period of time for completing the acid treatment may become too long from the viewpoint of industrial scale production. If the temperature of the acid liquid is higher than 70° C., the rate of a reaction for forming the silanol groups becomes high. However, such temperature causes evaporation of volatile components such as acid components and water. With this, the acid concentration of the acid liquid may deviate from a suitable range. Furthermore, devices disposed near the site for conducting the acid treatment may be corroded. If the immersion time in the acid liquid is shorter than 10 seconds, the formation of silanol groups may be insufficient. The immersion time longer than 600 seconds does not cause particular adverse effects, but is not preferable from the viewpoint of efficiency in industrial scale production. The acid treatment can be conducted by other coating methods such as spraying and flow coating, in addition to the immersion method.

In the second aspect of the invention, a coating liquid is applied to the glass substrate's surface which has been subjected to the acid treatment. The raw material for producing the water-repellent film, which is contained in this coating liquid, may be a fluoroalkyl-containing silane compound. This compound may be a fluoroisocyanate silane compound or a fluoroalkyl halogenated silane compound. In this case, this compound itself reacts with silanol group of the glass substrate's surface to form siloxane bonds, without subjecting hydrolysis. Therefore, it is not necessary to adjust the degree of hydrolysis and the degree of polycondensation of the disperse phase of the coating liquid.

The following nonlimitative examples are illustrative of the present invention.

EXAMPLE 1-1

In this example, a water-repellent film was formed on a glass substrate in accordance with the first aspect of the present invention, as follows.

At first, 1 g of a raw material for producing the water-repellent film, a fluoroalkylalkoxysilane (FAS), was mixed with 25 g of an isopropyl alcohol made by Kishida Chemical Co. and 0.3 g of a 0.1N nitric acid made by Kishida Chemical Co. This FAS was $CF_3(CF_2)_7CH_2CH_2Si(OCH_3)_3$, TSL8233 (trade name) of Toshiba Silicone Co. The resultant mixture was stirred at room temperature for about 2 hr, thereby to hydrolyze FAS. Then, about 5 g of a molecular sieve 4A made by Kishida Chemical Co. was immersed in the mixture. After that, the mixture (sol) was allowed to stand still for about 16 hr, thereby to conduct polycondensation of the dispersed phase of this sol and at the same time to remove water from the sol. Then, the molecular sieve was separated from the sol by filtration using a filter paper of No. 7, thereby to prepare a coating liquid.

Separately, a float glass substrate having a width of about 100 mm, a length of about 200 mm and a thickness of about 3.5 mm was abraded by using a ceria powder, then was washed with tap water, and then was rinsed with distilled water.

Then, the obtained coating liquid was applied to the top surface of the glass substrate in an atmosphere of room temperature and a relative humidity of about 55%, by rubbing a tissue paper moistened with the coating liquid thereagainst, thereby to form thereon a precursory film. Then, this precursory film was air-dried and then was heated at about 140° C. for about 5 minutes to dry and cure the precursory film into the water-repellent film.

The obtained water-repellent film formed on the glass substrate was subjected to the following evaluation tests. To evaluate its water repellency, the contact angle of water drop (2 $\mu$l of pure water) on the water-repellent film, that is, the initial contact angle, was measured in the atmosphere of about 25° C., by a CA-X type contact angle meter made by Kyowa Kaimen Kagaku Co. With this measurement, the initial contact angle was about 109 degrees.

In addition to the contact angle of water drop, the angle of inclination of the test piece (the coated glass substrate) to make water drop of 45 $\mu$l start falling down thereon was measured. The result of this measurement was about 30 degrees.

Figure 5:
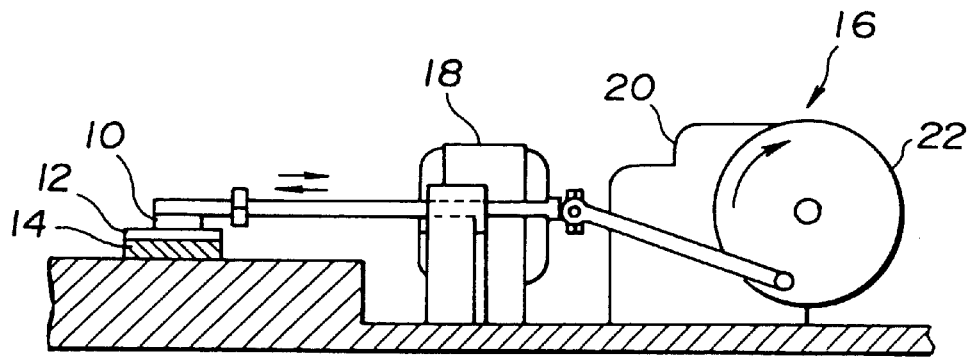
FIG. 5 is an elevational side view of a traverse-type abrasion resistance tester for evaluating the water-repellent film in abrasion resistance.

The test piece was subjected to an abrasion resistance test. In this test, as shown in FIG. 5, a piece of canvas 10 was slidingly moved on the water-repellent film 12 formed on the glass substrate 14, in a manner to traverse the test piece, using a traverse-type abrasion resistance tester 16, with a stroke of 100 mm, at a rate of 30 reciprocations per minute. In FIG. 5, designated by numerals of 18, 20 and 22 are a motor, a reduction gear casing and a crank disk, respectively. In this test, a load of 0.1 kg/cm$^2$ was added to the piece of canvas, in accordance with Japanese Industrial Standard (JIS) L 3102-1961-1206, of which disclosure is incorporated herein by reference in its entirety. The contact angle of water drop was measured in the same way as above, after 3,500 reciprocations of the piece of canvas. The result of this measurement ranged from about 103 to about 108 degrees.

Weatherability (sunshine or solar resistance) of the test piece was evaluated by a super UV accelerated weatherability test, using SUV-W11-type super UV accelerated weatherability tester of Iwasaki Denki Co. In this test, the water-repellent film was exposed to the super UV rays having an intensity of from about 75 to about 76 mW/cm$^2$, with a distance between the lamp and the test piece of about 25 mm, with a panel temperature of about 50° C., for periods of time of about 150 hr, about 300 hr, about 600 hr, about 750 hr and about 900 hr. After the 600 hr exposure, the contact angle of water drop disposed on the water-repellent film was measured in the same manner as above. The result of this measurement ranged from about 75 to about 80 degrees.

The test pieces were subjected to a chemical resistance test. In this test, various liquids, that is, engine oil, gear oil, 25% sulfuric acid, washer liquid, 50% CaCl$_2$ aqueous solution (pH=7), a limewater (pH=11), seawater and an antifreeze (LLC), were respectively dropped onto the water-repellent films. Then, some of the coated glass substrates were allowed to stand still for 24 hr in an atmosphere of room temperature and a relative humidity of 65%, and the others of the coated glass substrates were allowed to stand still for 24 hr at 80° C. After this standing, the contact angle of water drop disposed on the water-repellent film was measured in the same manner as above. The result of this measurement ranged from about 104 to about 108 degrees.

Comparative Example 1-1

At first, a glass substrate was washed by using a neutral detergent. Then, this glass substrate was coated with each of a methyl-silicone-based commercial water-repellent agent, SUPER RAIN X (trade name) made by UNELKO Co., and a fluorine-containing commercial water-repellent agent, ULTRA Glaco (trade name) made by SOFT99 Co., by rubbing a tissue paper moistened with the water-repellent agent thereagainst, thereby to form a precursor film thereon. This precursory film was dried to prepare a water-repellent film on the glass substrate. This water-repellent film was subjected to the same weatherability test as that of Example 1-1. After the exposure to the super ultraviolet radiation for about 200 hr, the contact angle of water drop disposed on the film was measured in the same manner as above. The result of this measurement was about 65 degrees.

EXAMPLE 1-2

In this example, Example 1-1 was slightly modified as follows. At first, first to sixth mixtures were respectively prepared by mixing 5 g, 10 g, 25 g, 30 g, 40 g and 60 g of the isopropyl alcohol with 1 g of the FAS and the 0.1N nitric acid containing 0.3 g of water. Then, the first to third mixtures, in which 5 g of the molecular sieve 4A had been respectively immersed, were respectively allowed to stand still for periods of time of 2 hr, 4 hr and 16 hr, and the fourth to sixth mixtures, in which 5 g of the molecular sieve 4A had been respectively immersed, were respectively allowed to stand still for a period of time of 24 hr. The thus obtained first to six coating liquids were respectively applied to the glass substrates in an atmosphere of room temperature and a relative humidity of up to 55%. The obtained first to six water-repellent films formed on the glass substrates were subjected to the same abrasion resistance test of 3,500 reciprocations of the piece of canvas, as that of Example 1-1. The results of the first to third water-repellent films were respectively in a range of higher than 100 degrees. Those of the fourth to sixth water-repellent films were respectively in ranges of from 99 to 105 degrees, of from 74 to 105 degrees, and of 50 to 95 degrees.

EXAMPLE 1-3

In this example, Example 1-1 was slightly modified as follows. At first, first to fourth mixtures were respectively prepared by mixing the 0.1N nitric acid in amounts so as to respectively contain water in amounts of up to 0.06 g, 0.10 g, 0.13 g and at least 0.30 g, with 1 g of the FAS and 25 g of the isopropyl alcohol. Then, the first to fourth mixtures, in which 5 g of the molecular sieve 4A had been respectively immersed, were respectively allowed to stand still for 24 hr. The thus obtained first to fourth coating liquids were respectively applied to the glass substrates in an atmosphere of room temperature and a relative humidity of 55%. The obtained first to fourth water-repellent films formed on the glass substrates were subjected to the same abrasion resistance test of 3,500 reciprocations of the piece of canvas, as that of Example 1-1. The results of the first to fourth water-repellent films were respectively in ranges of less than 60 degrees, of from 80 to 106 degrees, of from 93 to 107 degrees, and of greater than 100 degrees.

EXAMPLE 1-4

At first, first and second mixtures were respectively prepared by mixing 0.01 N and 13 N nitric acids of Kishida Chemical Co., each being in an amount of 1.0 g, with 1 g of the FAS, which is the same as that of Example 1, and 25 g of isopropyl alcohol of Kishida Chemical Co. The obtained first and second mixtures were respectively stirred at room temperature, for periods of time (hydrolysis time) as shown by the x-axis of FIG. 1, thereby to produce methanol formed by hydrolysis of the FAS. The molar ratio of this methanol to the FAS was determined by using a gas chromatograph of Shimazu Seisakusho Co. having a column of PIRAPK-Q and a TOD detector, with a constant column temperature of 150° C. and an internal standard of benzene. The results of this determination are shown in FIG. 1. By the results of FIG. 1, it was found that the molar ratio of the methanol to the FAS became a constant value of about 3.0 in about 120 min. Thus, it was judged that hydrolysis of the FAS has completely finished in about 120 min of stirring.

EXAMPLE 1-5

Figure 2:
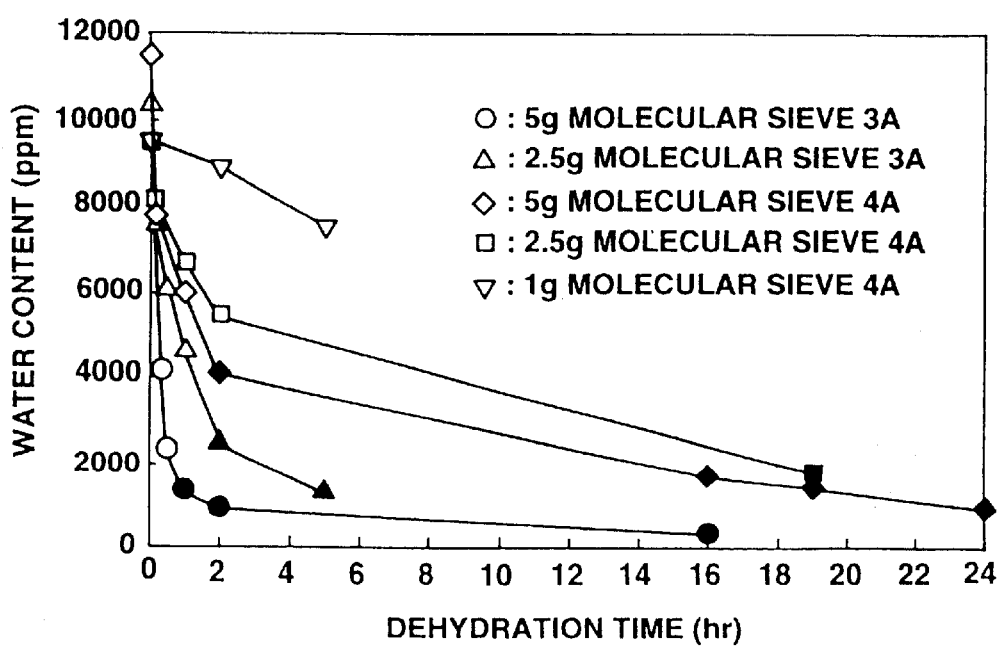
FIG. 2 is a graph showing the change of water content of the coating liquid of the first aspect of the present invention, with the period of time in which two types of molecular sieves were respectively immersed in the sols, which are precursors of the coating liquids, for removing water therefrom.

In this example, Example 1-1 was slightly modified as follows. At first, a mixture was prepared by mixing 1 g of the FAS with 25 g of the isopropyl alcohol and the 0.1N nitric acid containing 0.3 g of water. This step was repeated to prepare five of this mixture in total. Then, first and second coating liquids were respectively prepared by immersing molecular sieve 3A of Kishida Chemical Co. in amounts of 5 g and 2.5 g in two of the mixture, and third to fifth coating liquids were respectively prepared by immersing the molecular sieve 4A in amounts of 5 g, 2.5 g and 1 g in three of the mixture, for periods of time (dehydration time) as shown by the x-axis of FIG. 2. After the immersion of molecular sieve for a period of time for removing water from the coating liquid, water content of the coating liquid was measured by using a Karl Fischer's coulometric titration method. The results of this measurement are shown in FIG. 2. In FIG. 2, black marks represent test pieces of which contact angle of water drop after the same abrasion resistance test of 3,500 reciprocations as that of Example 1-1 were at least about 95 degrees.

EXAMPLE 1-6

In this example, Example 1-1 was slightly modified as follows. At first, a mixture was prepared by mixing 1 g of the FAS with 25 g of the isopropyl alcohol and the 0.1N nitric acid containing 0.3 g of water. Then, a coating liquid was prepared by immersing 5 g of the molecular sieve 4A for 16 hr. Then, first to fourth test pieces were respectively prepared by applying the coating liquid to the surfaces of the glass substrates in atmospheres of room temperature and first to fourth relative humidities of from 15 to 55%, of from 56 to 60%, of from 70 to 80% and of at least 90%, to form thereon precursory films) and then by heating the precursory films at about 140° C. for about 5 min to dry and cure the precursory films into the water-repellent films. Only the fourth test piece had dew condensation thereon. The first to fourth test pieces were subjected to the same abrasion resistance test of 3,500 reciprocations as that of Example 1-1. The results of this test on the first to fourth test pieces were respectively of higher than 100 degrees, of from 88 to 105 degrees, of from 80 to 101 degrees and of about 60 degrees.

EXAMPLE 1-7

Figure 3:
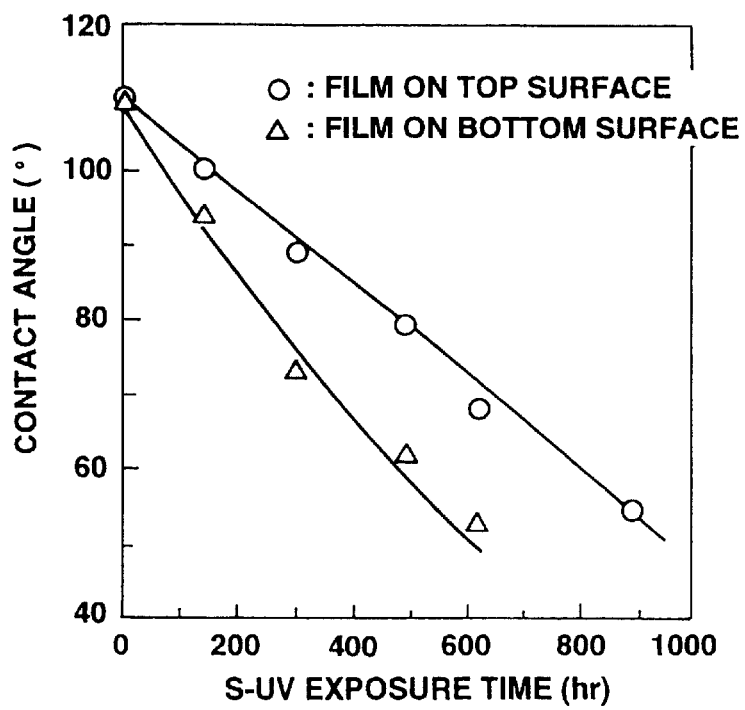
FIG. 3 is a graph showing the change of contact angle of water drops disposed on water-repellent films of the first aspect of the present invention which were respectively formed on the top and bottom surfaces of a float glass substrate and then exposed to the super ultraviolet (S-UV) radiation.

In this example, Example 1-1 was slightly modified as follows. At first, a mixture was prepared by mixing 1 g of the FAS with 25 g of the isopropyl alcohol and the 0.1N nitric acid containing 0.3 g of water. Then, a coating liquid was prepared by immersing 5 g of the molecular sieve 4A for about 24 hr. Then this molecular sieve was removed from the coating liquid by filtration using a filter paper No. 7. Separately, a float glass substrate was prepared by subjecting its top surface to only washing with water and by subjecting its bottom surface to abrasion with ceria powder then to washing with water. Then, the coating liquid was respectively applied to the top and bottom surfaces of the glass substrate. After that, the coated glass substrate was heated to about 140° C. by spending 5 min and then was maintained at this temperature for 5 min, in a middle-sized hot air circulating furnace, to cure the precursory films into the water-repellent films. This test piece was subjected to the same super UV accelerated weatherability test as that of Example 1-1. The results are shown in FIG. 3. Furthermore, the test piece was subjected to the same abrasion resistance test of 3,500 reciprocations as that of Example 1-1. The results of this test on the water-repellent films formed on the top and bottom surfaces of the glass substrate were respectively higher than 100 degrees and from 50 to 100 degrees.

EXAMPLE 1-8

Figure 4:
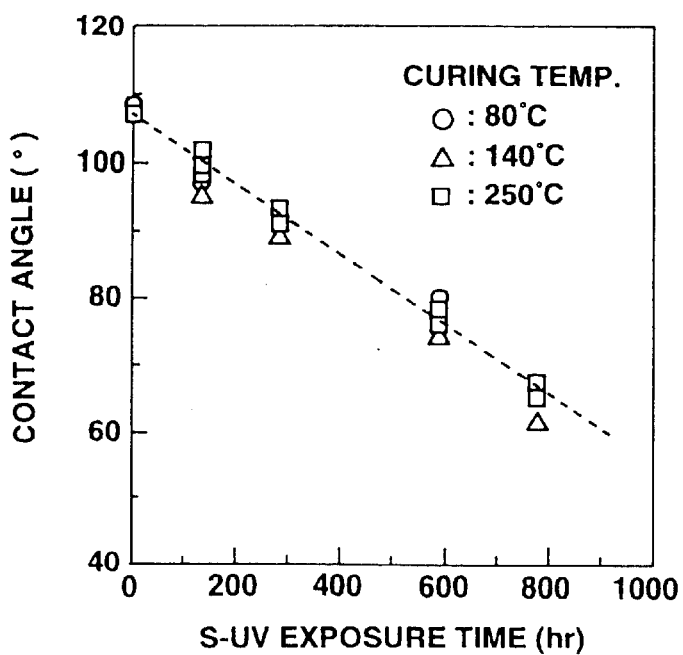
FIG. 4 is a graph showing the change of contact angle of water drops disposed on water-repellent films of the first aspect of the present invention which were respectively prepared by curing precursory films at three temperatures and then exposed to the S-UV radiation.

In this example, Example 1-1 was repeated except in that the precursory films were respectively heated at temperatures of about 80° C. and about 250° C. for curing Then, the test pieces were subjected to the same super UV accelerated weatherability test as that of Example 1-1. The results of this test are shown in FIG. 4. In FIG. 4, the results of a curing temperature of 140° C. are of Example 1-1.

EXAMPLE 2-1

In this example, the coating liquid was prepared in the same manner as that of Example 1-1.

Figure 6:
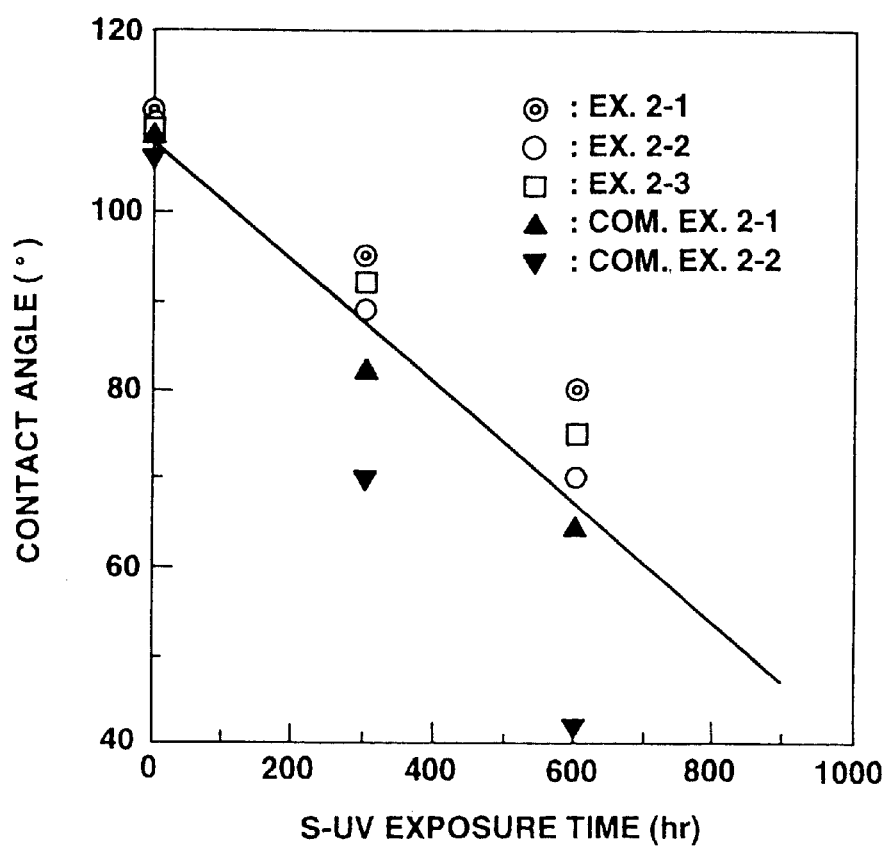
FIG. 6 is a graph showing the change of contact angle of water drops disposed on water-repellent films according to Examples 2-1, 2-2 and 2-3 of the second aspect of the present invention and Comparative Examples 2-1 and 2-2, which films were exposed to the S-UV radiation.

Separately, a glass substrate having a width of about 200 mm, a length of about 300 mm and a thickness of about 3.5 mm was subjected to an abrasive treatment, with a brash hand polisher, using an abrasive liquid containing 1 part by weight of an abrasive agent, MIREK (A+B) of Mitsui Kinzoku Kogyo Co., suspended in 100 parts by weight of water. Then, the glass substrate was sufficiently washed with water. Then, the glass substrate was immersed in a 0.1N hydrochloric acid aqueous solution having a pH of about 1 and a temperature of about 35° C., for about 1 min. After that, the glass substrate was washed again with water. Then, the coating liquid was applied to the top surface of the glass substrate in the same manner as that of Example 1-1, thereby to form thereon a precursory film. Then, the precursory film was cured in the same manner as that of Example 1-1 With this, a water-repellent film having a thickness of from 5 to about 25 nm was formed thereon. The thus obtained test piece was subjected to the same evaluation tests, except slight modifications of the super UV accelerated weatherability test as follows. In this test, the intensity of the super UV rays was about 76 mW/cm$^2$, the distance between the lamp and the test piece was about 24 mm, the panel temperature was about 50° C., the relative humidity of the atmosphere was about 50%, and the periods of time for the super UV exposure were about 300 hr and about 600 hr. The results of the evaluation tests were as follows. The initial contact angle was about 111 degrees. The angle of inclination was about 30 degrees. The result of the abrasion resistance test ranged from about 104 to more than about 105 degrees. The result of the chemical resistance test ranged from about 104 to about 108 degrees. The results of the weatherability test for about 300 hr and about 600 hr are respectively shown in FIG. 6. Furthermore, the results of the weatherability test of the after-mentioned Examples 2-2 and 2-3 and Comparative Examples 2-1 and 2-2 are also shown in FIG. 6. As to the data shown in FIG. 6, the marks positioned higher than the straight line in FIG. 6 in a direction of the y-axis were judged as being satisfactory in the weatherability test.

EXAMPLE 2-2

In this example, Example 2-1 was repeated except in that the abrasive liquid contained 1,000 parts by weight of water relative to 1 part by weight of the abrasive agent. The results of the evaluation tests were as follows. The initial contact angle was about 110 degrees. The angle of inclination was about 30 degrees. The result of the abrasion resistance test ranged from about 98 to more than about 103 degrees. The result of the chemical resistance test was more than about 100 degrees.

EXAMPLE 2-3

In this example, Example 2-1 was repeated except in that the acid treatment was conducted by immersing the glass substrate in a 0.001 N hydrochloric acid aqueous solution having a pH of about 3.5. The results of the evaluation tests were as follows. The initial contact angle was about 109 degrees. The angle of inclination was about 31 degrees. The result of the abrasion resistance test ranged from about 100 to more than about 102 degrees. The result of the chemical resistance test was more than about 100 degrees.

Comparative Example 2-1

In this comparative example, Example 2-1 was repeated except in that the acid treatment was conducted by immersing the glass substrate in the 0.1 N hydrochloric acid aqueous solution for about 5 seconds. The results of the evaluation tests were as follows. The initial contact angle was about 108 degrees. The angle of inclination was about 35 degrees. The result of the abrasion resistance test ranged from about 100 to about 104 degrees. The result of the chemical resistance test was more than about 100 degrees.

Comparative Example 2-2

In this comparative example, Example 2-1 was repeated except in that the abrasive and acid treatments on the glass substrate were omitted. The results of the evaluation tests were as follows. The initial contact angle was about 106 degrees The angle of inclination was about 35 degrees The result of the abrasion resistance test ranged from about 83 to about 95 degrees. The result of the chemical resistance test was more than about 100 degrees.

The entire disclosure of each of Japanese Patent Application Nos. 8-217510 filed on Aug. 19, 1996 and 8-333329 filed on Dec. 13, 1996, including specification, claims, summary and drawings, is incorporated herein by reference in its entirety.

What is claimed is:

1. A coating liquid for forming a water-repellent film, said coating liquid being prepared by a method comprising the sequential steps of:

(a) forming a mixture consisting essentially of 1 part by weight of at least one fluoroalkylalkoxysilane for producing said water-repellent film, 5–40 parts by weight of an organic solvent for diluting said at least one fluoroalkylalkoxysilane, and an acid catalyst containing water for hydrolyzing said at least one fluoroalkylalkoxysilane, such that said at least one fluoroalkylalkoxysilane is subjected to hydrolysis and then to dehydration and polycondensation, to thereby turn a mixture of said at least one fluoroalkylalkoxysilane, said organic solvent and said acid catalyst into a sol; and (b) removing water from said sol to adjust the water content of said sol to less than 4000 ppm, thereby to prepare said coating liquid.

2. A coating liquid according to claim 1, wherein said at least one fluoroalkylalkoxysilane is selected from the group consisting of $CF_3CH_2CH_2Si(OCH_3)_3$, $CF_3(CF_2)_5CH_2CH_2Si(OCH_3)_3$, $CF_3(CF_2)_5CH_2CH_2SiCH_3(OCH_3)_2$, $CF_3(CF_2)_7CH_2CH_2Si(OCH_3)_3$, and $CF_3(CF_2)_7CH_2CH_2SiCH_3(OCH_3)_2$.

3. A coating liquid according to claim 1, wherein said at least one fluoroalkylalkoxysilane is represented by the following formula:

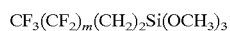

$$CF_3(CF_2)_m(CH_2)_2Si(OCH_3)_3$$

where m is an integer of 0–7.

4. A coating liquid according to claim 1, wherein said at least one fluoroalkylalkoxysilane is represented by the following formula:

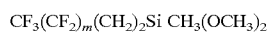

$$CF_3(CF_2)_m(CH_2)_2Si\,CH_3(OCH_3)_2$$

where m is an integer of 5–7.

* * * * *